US012382561B2

(12) United States Patent
Wu et al.

(10) Patent No.: US 12,382,561 B2
(45) Date of Patent: Aug. 5, 2025

(54) LED DRIVING APPARATUS, MICROCONTROLLER, AND CONTROL METHOD FOR LED MODULE

(71) Applicant: NUVOTON TECHNOLOGY CORPORATION, Hsinchu (TW)

(72) Inventors: Chun-Yi Wu, Zhubei (TW); Lian-Cheng Tsai, Zhubei (TW); Chih-Wei Tsai, Zhubei (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 102 days.

(21) Appl. No.: 18/406,394

(22) Filed: Jan. 8, 2024

(65) Prior Publication Data

US 2025/0089140 A1 Mar. 13, 2025

(30) Foreign Application Priority Data

Sep. 12, 2023 (TW) .................................. 112134663

(51) Int. Cl.
*H05B 45/30* (2020.01)
*H05B 45/46* (2020.01)
*H05B 45/50* (2022.01)

(52) U.S. Cl.
CPC ............. *H05B 45/50* (2020.01); *H05B 45/46* (2020.01)

(58) Field of Classification Search
CPC ...... H05B 45/10; H05B 45/30; H05B 45/345; H05B 45/46; H05B 45/50; H05B 47/10; H05B 47/14
See application file for complete search history.

(56) References Cited

U.S. PATENT DOCUMENTS

2023/0020031 A1* 1/2023 Koshima .............. H05B 45/345

* cited by examiner

*Primary Examiner* — Jimmy T Vu
(74) *Attorney, Agent, or Firm* — Muncy, Geissler, Olds & Lowe, P.C.

(57) ABSTRACT

An LED driving apparatus, a microcontroller, and a control method for an LED module are provided. The LED driving apparatus includes a power supply module, a switch module, and a control module. The power supply module is configured to supply power to the LED module, in which the power supply module determines whether to trigger an overcurrent protection based on whether an output current exceeds a threshold current. The control module is configured to receive an overcurrent detection signal to control a conduction state of the switch module, so as to affect the current amount of the LED module. When the overcurrent detection signal indicates the output current exceeds the threshold current, the control module outputs a first control signal based on the overcurrent detection signal to control the switch module, to prevent the overcurrent protection from being triggered.

10 Claims, 6 Drawing Sheets

LED DRIVING APPARATUS, MICROCONTROLLER, AND CONTROL METHOD FOR LED MODULE

BACKGROUND

1. Field of the Invention

The present disclosure relates to an LED driving control technique, and more particularly, to an LED driving device, a microcontroller, and a control method of an LED module.

2. Description of the Related Art

The present disclosure relates to an LED driving control technique, and more particularly, to an LED driving device, a microcontroller, and a control method of an LED module.

DESCRIPTION OF THE PRIOR ART

With the advancement of technologies, casual computer players not only focus on the improved computer hardware performance, but also pursue personalized settings and visual effects of the computer systems in order to show the user's personal style. Therefore, in the current computer assemblies, it is common to see that users may attempt to enhance a certain sense of atmosphere on the computer system by arranging LED light bars on the computer, so as to improve the overall user experience.

In the computer system, the power supply usually has a set of 12V power supply for plugging in the external LED light bar. To avoid the damage of the power supply, manufacturers usually add current-limiting elements to provide the overcurrent protection function in the power supply, so as to protect the power supply from the risk of burning due to excessive current.

However, due to the differences in design and manufacturing of LED light bars, they may not necessarily match the power specifications. Some LED light bars may have high power requirements, and when the power required by the LED light bars exceeds the power supply's capability, the power supply may trigger the overcurrent protection function and stop outputting current to the LED light bars.

When the above issue happens, the user can only observe that the LED light bar is not lit and cannot accurately know whether the LED light bar cannot be lit is due to a damaged socket or mismatch in specification.

SUMMARY

The present disclosure provides an LED driving device, a microcontroller, and a control method of an LED module, which can solve the above-addressed problems in the related art techniques.

The present disclosure provides an LED driving device for driving an LED module. The LED driving device comprises a power supply module, a switch module, and a control module. The power supply module is configured to supply power to the LED module and has an overcurrent protection function. The power supply module detects an output current provided to the LED module, wherein the power supply module determines whether to trigger the overcurrent protection function based on whether the output current exceeds a threshold current. The switch module is connected in series with the LED module. The control module is coupled to the power supply module and the switch module, and is configured to receive an overcurrent detection signal indicating whether the output current exceeds the threshold current, and control a conduction state of the switch module based on the overcurrent detection signal to adjust a current passing through the LED module. When the overcurrent detection signal indicates that the output current exceeds the threshold current, the control module outputs a first control signal based on the overcurrent detection signal to control the switch module to prevent the overcurrent protection function from being triggered.

The present disclosure provides a microcontroller, suitable for controlling an LED module, comprises an overcurrent control unit and a control signal generation unit. The overcurrent control unit is configured to receive an overcurrent detection signal and generate a current limit indication signal based on the overcurrent detection signal. The control signal generation unit is coupled to the overcurrent control unit, and configured to generate a first control signal or a second control signal based on the current limiting indication signal to control a conduction state of the LED module. When the overcurrent control unit receives the overcurrent detection signal with a first signal characteristic, the overcurrent control unit outputs the enabled current limit indication signal, so that the control signal generation unit outputs the first control signal in response to the enabled current limit indication signal. When the overcurrent control unit receives the overcurrent detection signal with a second signal characteristic, the overcurrent control unit outputs the disabled current limit indication signal, so that the control signal generation unit outputs the second control signal in response to the disabled current limit indication signal. A current generated by the LED module in response to the first control signal is smaller than a current generated by the LED module in response to the second control signal.

The present disclosure provides a method for controlling an LED module. The method comprises: supplying, by a power supply module, power to the LED module; receiving, by a control module, an overcurrent detection signal of the power supply module, wherein the overcurrent detection signal indicates whether an output current provided to the LED module exceeds a threshold current, to make the power supply module decide whether to trigger an overcurrent protection function; outputting, by the control module, a first control signal to control a conduction state of the LED module to prevent the power supply module from triggering the overcurrent protection function when the overcurrent detection signal indicates that the output current exceeds the threshold current; and outputting, by the control module, a second control signal different from the first control signal to control the conduction state of the LED module when the overcurrent detection signal indicates that the output current does not exceed the threshold current. A current generated by the LED module in response to the first control signal is smaller than a current generated by the LED module in response to the second control signal.

Based on the above, the LED driving device, the microcontroller and the control method of the LED module in the embodiments of the present disclosure can detect the operational state of the power supply module by capturing the overcurrent detection signal, and further reduce the output current of the power supply module by reducing the conduction time and/or frequency of the LED module when there is potential overcurrent risks, so that the LED module cannot be lit without triggering the overcurrent protection function when the specifications of the LED module and the LED driving device mismatch. In addition, the LED driving device of this embodiment can further make the LED module send a prompt to remind the user that there may be a specification mismatch between the current LED module and the LED driving device when the power supply module is determined as having the overcurrent condition.

BRIEF DESCRIPTION OF THE DRAWINGS

In order to allow the abovementioned and other purposes, features, advantages and embodiments of the present disclosure to be more clearly understood, the accompanying drawings are described as following.

DESCRIPTION OF THE PREFERRED EMBODIMENTS

The present disclosure provides a novel LED driving device, a microcontroller, and a control method of an LED module, to solve the problems mentioned above in the related art techniques. In order to make the features and advantages of the present disclosure more obvious and easier to understand, specific embodiments of the present disclosure are described in detail with reference to the accompanying drawings. The following description contains specific information related to exemplary embodiments in this disclosure. The accompanying drawings and the detailed description in this disclosure are only exemplary embodiments, the present disclosure is not limited to these exemplary embodiments. As some other variations of the embodiments of the present disclosure might be made by those skilled in the art, they should fall within the scope of the present disclosure. Unless otherwise specified, the same or corresponding elements in the drawings may be indicated by the same or corresponding reference numerals. Furthermore, the drawings and illustrations in this disclosure are generally not drawn in exact scales and are not meant to meet actual sizes.

Figure 1:
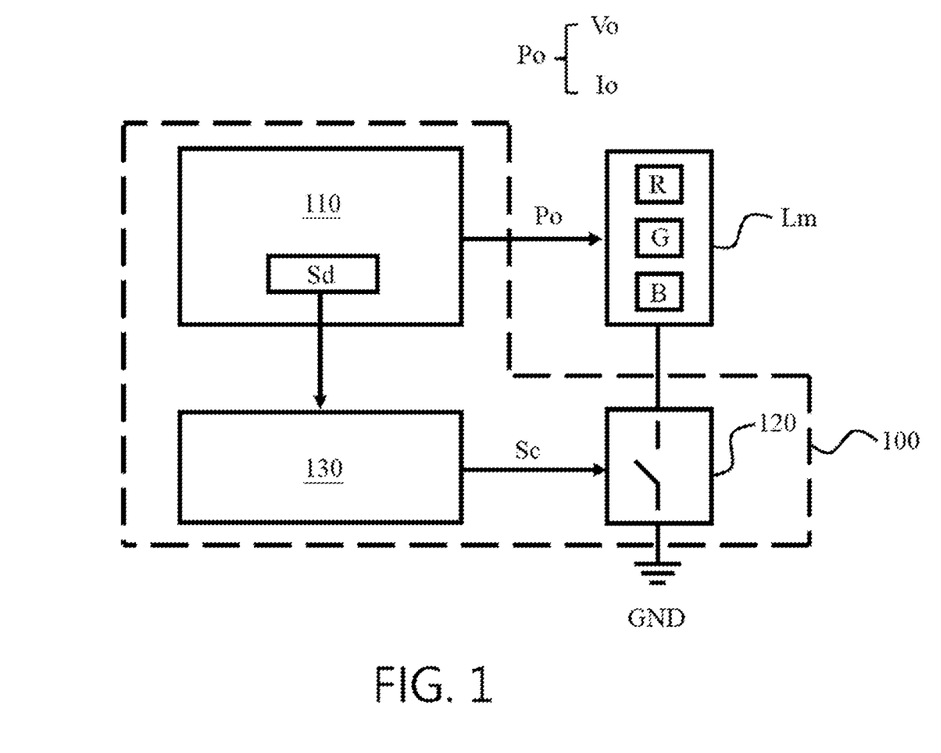
FIG. 1 is a schematic diagram of an LED driving device based on an embodiment.

FIG. 1 is a schematic diagram of an LED driving device based on an embodiment. Please refer to FIG. 1, the LED driving device 100 of this embodiment is suitable for driving the LED module Lm, so that the LED module Lm is lit. The LED module Lm may be an LED light bar which is pluggably connected with the LED driving device 100, and the LED light bar can be a monochrome (e.g., a white light bar) or multichrome light bar (e.g., a tricolor light bar including red (R), green (G) and blue (B) lighting units), but the present disclosure is not limited thereto.

In this embodiment, the LED driving device 100 includes a power supply module 110, a switch module 120 and a control module 130.

The power supply module 110 is coupled to the LED module Lm for supplying power to the LED module Lm, so that the LED module Lm is lit in response to the output power Po provided by the power supply module 110, wherein the output power Po may include an output voltage Vo applied to the LED module Lm and/or an output current Io provided to the LED module Lm. In addition, in order to ensure the operation reliability and safety of the power supply module 110, the power supply module 110 also detects the output current Io provided to the LED module Lm, and decide whether to trigger the overcurrent protection function of the power supply module 110 based on whether the output current Io exceeds the threshold current.

Said overcurrent protection function may be that the power supply module 110 stops providing the output power Po to the LED module Lm when it is determined that overcurrent occurs. In other words, when the overcurrent protection function is triggered, the LED module Lm does not emit light.

In some embodiments, the power supply module 110 may include, for example, a conversion circuit (not shown, which is further described in the subsequent embodiments) for generating a stable output power Po and an overcurrent protection circuit (not shown, which is further described in the subsequent embodiments) for preventing the power supply module 110 from overcurrent. The overcurrent protection circuit detects the output current Io to generate an overcurrent detection signal Sd indicating whether the output current Io exceeds the threshold current, and decide whether to trigger the overcurrent protection function based on the overcurrent detection signal.

In addition, the output current Io can be sampled/detected in the form of root mean square (rms) current or the form of peak current, which is not limited by the present disclosure. In some practical applications, the output current Io is converted into voltage during sampling/detection. For example, if the current is detected by a current detecting resistor, the voltage across the current detecting resistor can actually indicate the current. Therefore, when comparing the output current Io with the threshold current, it can be realized by comparing a sampling voltage with a reference voltage representing the threshold current with a voltage comparator.

In addition, in the operation of determining whether to trigger the overcurrent protection function based on the overcurrent detection signal Sd, the present disclosure does not limit that the overcurrent protection function can only be triggered upon that the overcurrent detection signal Sd indicates that the output current Io exceeds the threshold current. That is, the power supply module 110 is not limited to immediately triggering the overcurrent protection function when it is determined that the output current Io exceeds the threshold current. In some applications, the trigger condition of the overcurrent protection function can also be determined referring to some other conditions. For example, the power supply module 110 may trigger the overcurrent protection function after determining that the duration of overcurrent exceeds a set value, but the present disclosure is not limited thereto.

The switch module 120 is connected in series with the LED module Lm, and is controlled by a control signal Sc to switch the conduction state, thereby affecting the current of the LED module Lm connected in series therewith. In other words, when the switch module 120 is turned on, the LED module Lm and the switch module 120 forms a current path conducted to the ground terminal GND, so that the output current Io can flow in the conducted current path, and then the LED beads in the LED module Lm emits light in response to the flowing current. Conversely, when the switch module 120 is turned off, the current path is turned off.

In some embodiments, if the LED module Lm includes a plurality of groups of LED units (or LED strings), the switch module 120 may include a plurality of switches (not shown, but further illustration can be found in subsequent embodiments) corresponding to the LED units, so as to be respectively connected in series with the plurality of groups of LED units.

The control module 130 is coupled to the power supply module 110 and the switch module 120. The control module 130 is used to receive the overcurrent detection signal Sd indicating whether the output current Io exceeds the threshold current, and control the conduction state of the switch module 120 based on the overcurrent detection signal Sd.

In this embodiment, when the control module 130 receives the overcurrent detection signal Sd indicating that the output current Io exceeds the threshold current, the control module 130 outputs a control signal Sc with a specific format based on the overcurrent detection signal Sd to control the switching module 120, so as to reduce the current/output current Io through the LED module Lm, and prevent the overcurrent protection function of the power supply module 110 from being triggered. The control signal Sc with a specific format described herein can be referred to as the first control signal in the present disclosure.

On the other hand, when the control module 130 receives the overcurrent detection signal Sd indicating that the output current Io does not exceed the threshold current, the control module 130 outputs a control signal Sc with a signal format different from the first control signal based on the overcurrent detection signal Sd to control the switching module 120. The control signal Sc with signal format different from that of the first control signal can be referred to as the second control signal in the present disclosure. The signal format difference between the first control signal and the second control signal may be duty ratio and/or frequency, that is, the first control signal and the second control signal are different in at least one of the duty ratio and frequency, so that the output current Io generated in response to the first control signal is smaller than that generated in response to the second control signal.

Specifically, in normal operation, once the power supply module 110 has abnormal operation (e.g., overcurrent), the power supply module 110 automatically triggers the protection mechanism to stop or limit the power supply to the LED module Lm. To the user, however, he or she can only be aware of that the LED module Lm cannot work normally without knowing the reasons why it cannot work normally. Debugging efforts is needed to actually solve the problems.

For example, if the LED module Lm is an external LED light bar, its working specifications may not necessarily match the rated output specifications of the power supply module 110. If the LED module Lm with mismatched specifications is connected to the power supply module 110, the output current Io of the power supply module 110 may be too large, resulting in the triggering of the overcurrent protection function. At this moment, the user can only observe that the LED module Lm cannot be lit after connecting to the power supply module 110. The user, however, cannot judge whether the LED module Lm unable to be lit is due to malfunction of the power supply module 110, damages on the LED module Lm in the first place, or mismatch between the power supply module 110 and the LED module Lm in specifications.

In this embodiment, the control module 130 can be aware of the operational state of the power supply module 110 by capturing the overcurrent detection signal Sd of the power supply module 110, and further reduce the output current Io of the power supply module 110 through reducing the on-time and/or frequency of the LED module Lm when the power supply module 110 may have the risk of overcurrent. In this way, the overcurrent protection function of the power supply module 110 is prevented from being triggered while the LED module Lm can still be lit.

Figure 2A:
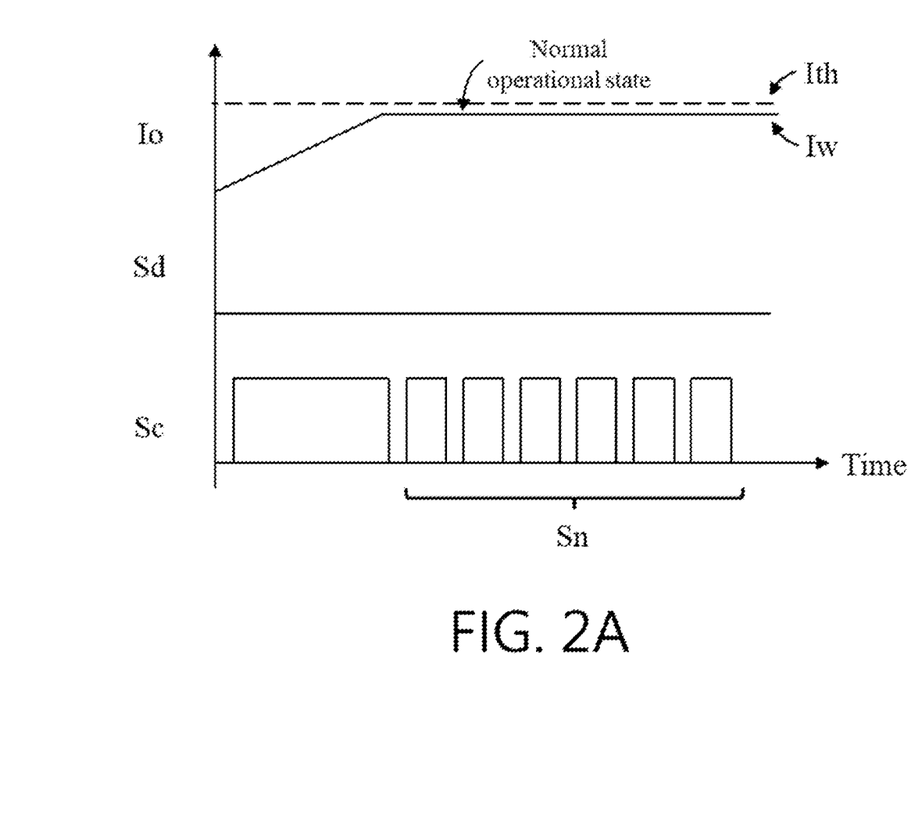
FIGS. 2A and 2B are timing diagrams illustrating signals of the LED driving device under different states based on the embodiment of FIG. 1.
Figure 2B:
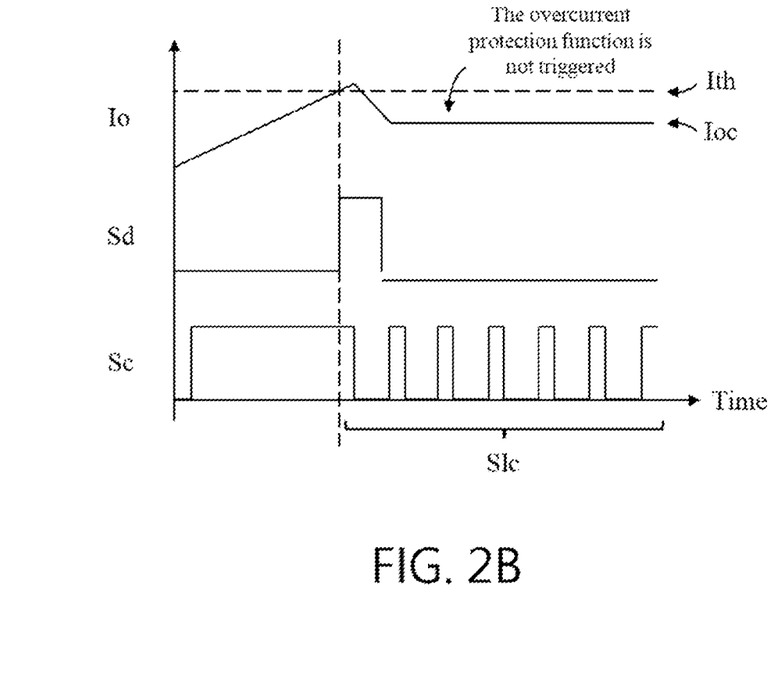

Next, the operation process of the LED driving device 100 in different states is further explained with reference to FIG. 2A and FIG. 2B. FIG. 2A and FIG. 2B are timing diagrams illustrating signals of the LED driving device under different states based on the embodiment of FIG. 1.

Please refer to FIG. 1 and FIG. 2A. Under the condition that the specifications of the output Power Po of the power supply module 110 and the LED module Lm match, the power supply module 110 provides the LED module Lm with the output current Io which is substantially stable at the current value Iw after the power supply module 110 is enabled, wherein the current value Iw is less than the threshold current Ith, so the power supply module 110 enters a normal working state and does not trigger the overcurrent protection function.

In a normal working state, the control module 130 outputs a normal working signal Sn (i.e., the aforementioned second control signal) as a control signal Sc, wherein the normal working signal Sn can be a periodic square wave signal in this embodiment, and the control module 130 can adjust the brightness, color, lighting sequence or pattern by modulating the duty ratio of the square wave signal, but the present disclosure is not limited thereto. In some embodiments, the normal operation signal/second control signal Sn can also be an enabling signal with a fixed level, so as to keep the switch module 120 in a conducting state under the normal operational state, but the present application is not limited thereto.

Referring to FIGS. 1 and 2B, if the specifications of the output power Po of the power supply module 110 and the LED module Lm do not match, the output current Io of the power supply module 110 gradually rises to exceed the threshold current Ith after the power supply module 110 is enabled, so that the overcurrent detection signal Sd is triggered to a high level. In this embodiment, based on the high-level overcurrent detection signal Sd, the control module 130 changes the originally scheduled normal operation signal Sn into the output current-limiting signal Slc (i.e., the aforementioned first control signal) as the control signal Sc, in which the LED module Lm draws less current in response to the control of the current-limiting signal Slc, so that the output current Io drops to a current value Ios lower than the threshold current Ith, so as to prevent the overcurrent protection function from being triggered.

More specifically, in this embodiment, the current limiting signal Slc may also be a periodic square wave, but the duty ratio of the current limiting signal Slc is smaller than that of the normal working signal Sn. In other words, when the switch module 120 is controlled by the current-limiting signal Slc with a smaller duty ratio, the LED module Lm responds to the control of the current-limiting signal Slc and have a shorter on-time in each cycle, thus reducing the output current Io.

In some embodiments, the current limiting signal Slc and the normal operation signal Sn can also be set to have the same duty ratio, but the frequency of the current limiting signal Slc is lower than that of the normal operation signal Sn. This setting can also achieve the effect of lowering the output current Io to below the threshold current.

As can be seen from the above descriptions of FIGS. 2A and 2B, in the LED driving device 100 of this embodiment, even if the specifications of the power supply module 110 and the LED module Lm do not match, the output current Io of the power supply module 110 can be reduced, through the control of the control module 130, down to a level that does not trigger the overcurrent protection function, so that the LED module Lm with mismatched specifications can still be lit.

In some embodiments, by setting the current limiting signal Slc, it can be further realized that the LED module Lm generates an overcurrent prompt to remind the user that there could be a specification mismatch between the current LED module Lm and the power supply module 110.

For example, the current limiting signal Slc can be set to have a lower duty ratio/frequency, so that when the switching module 120 switches in response to the current limiting signal Slc, the LED module Lm has a significantly darker luminous brightness (compared with the normal working state). This can be used as an overcurrent prompt, so that users can know that the current configuration may have the problem of specification mismatch once they notice that the LED module Lm is obviously dim.

In addition to changing the luminous brightness to prompt the user, in some embodiments, the current limiting signal Slc can also be set to make the LED module Lm flash, alternately emit different colors, or only emit monochromatic light as an overcurrent prompt, but the present disclosure is not limited thereto.

Figure 3A:
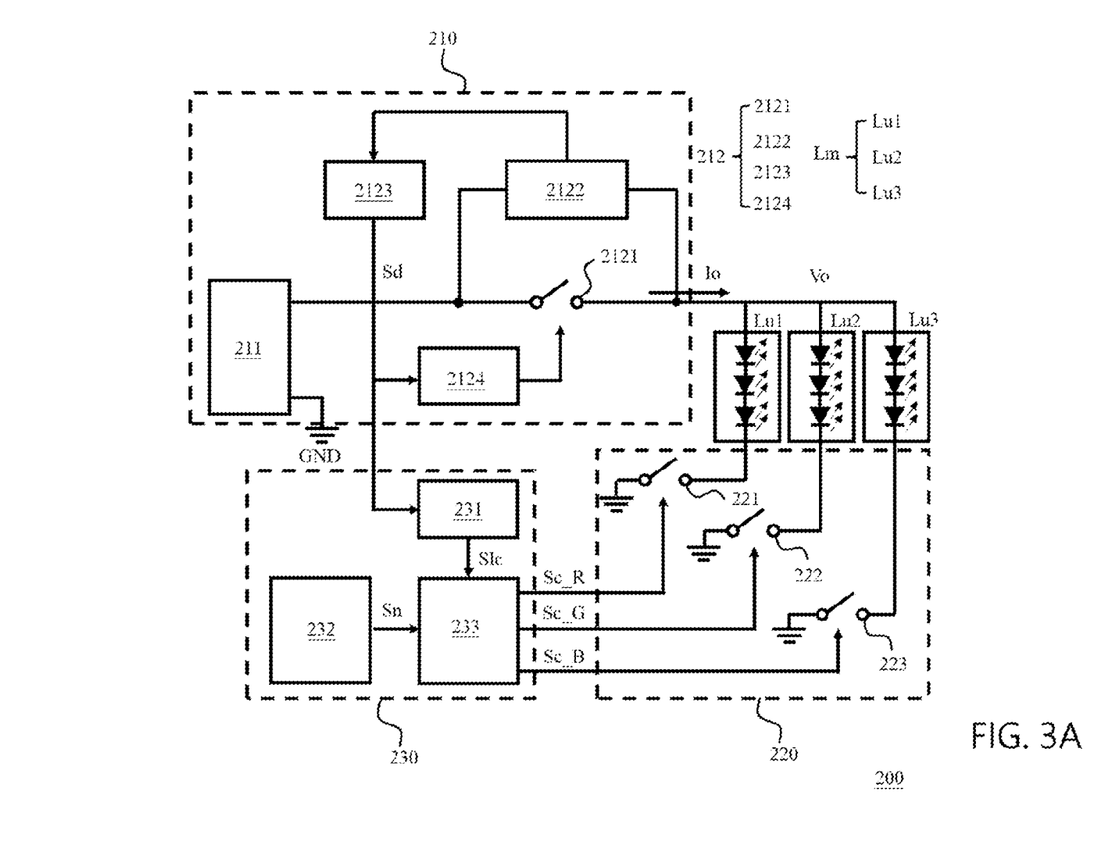
FIGS. 3A and 3B are schematic diagrams of LED driving devices based on different embodiments of the present disclosure.
Figure 3B:
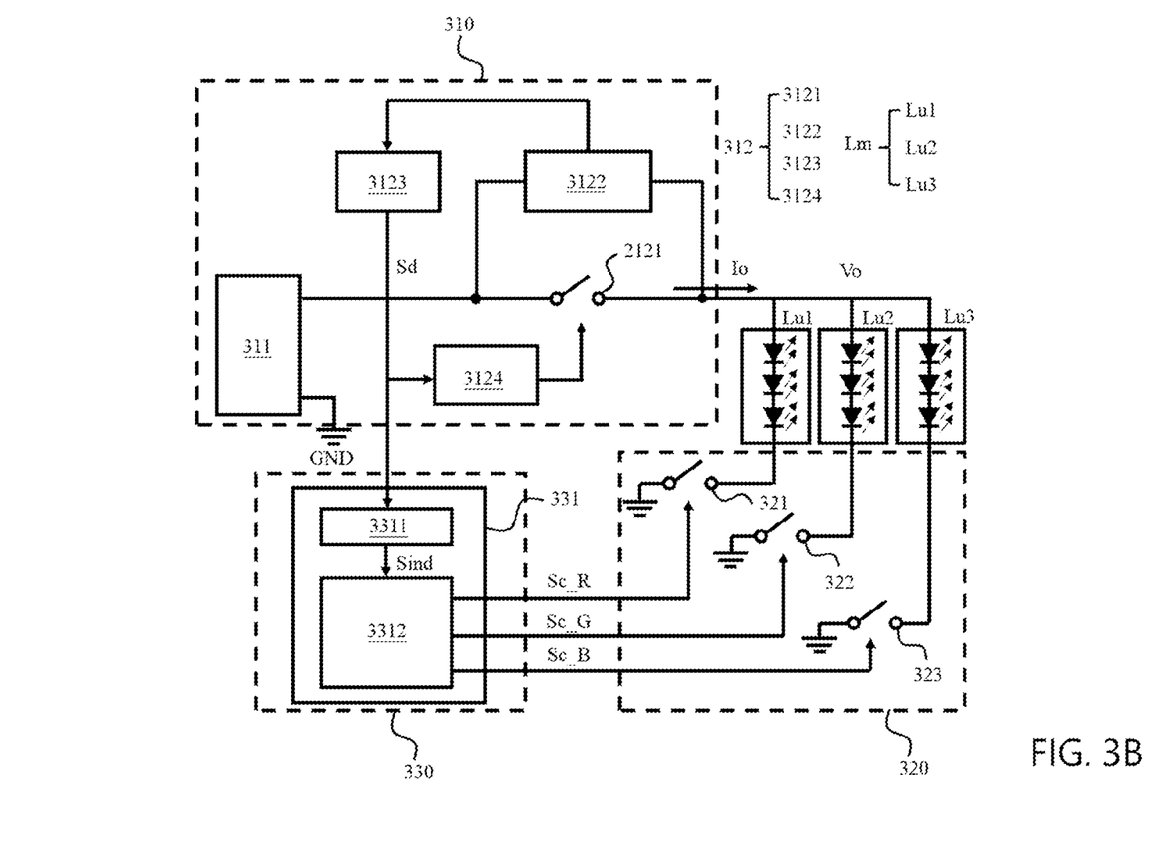

A specific example of the above LED driving device 100 is described below with reference to FIG. 3A and FIG. 3B. FIG. 3A and FIG. 3B are schematic diagrams of LED driving devices based on different embodiments of the present disclosure.

Referring to FIG. 3A, the LED module Lm in this embodiment is implemented with three light-emitting units Lu1-Lu3 with different wavelengths, in which each light-emitting units Lu1-Lu3 may include a plurality of LED beads connected in series. The light-emitting wavelength of the LED beads in the first wavelength light-emitting unit Lu1 may be in the band of red light, the light-emitting wavelength of the LED beads in the second wavelength light-emitting unit Lu2 may be in the band of green light, and the light-emitting wavelength of the LED beads in the third wavelength light-emitting unit Lu3 may be in the band of blue light, but the present disclosure is not limited thereto. For better understanding, the first to third wavelength light emitting units Lu1-Lu3 are called the red light unit Lu1, green light unit Lu2 and blue light unit Lu3, respectively.

In this embodiment, the LED driving device 200 includes a power supply module 210, a switch module 220 and a control module 230. The power supply module 210 includes a conversion circuit 211 and an overcurrent protection circuit 212. The switch module 220 includes a first switch module 221, a second switch module 222 and a third switch module 223. The control module 230 includes a control signal generation circuit 231, a microcontroller 232 and an output control circuit 233.

In the power supply module 210, the conversion circuit 211 is used to convert the received input power supply into a stable output power Po. The overcurrent protection circuit 212 is coupled to the conversion circuit 211 and the LED module Lm, and is used for detecting the output current Io to determine whether an overcurrent situation occurs, and trigger the overcurrent protection function when determining the occurrence of overcurrent.

The overcurrent protection circuit 212 includes a current limiting element 2121, a current detecting circuit 2122, an overcurrent determination circuit 2123 and a protection trigger circuit 2124. The current limiting element 2121 is connected in series with the power supply loop of the conversion circuit 211. The current detection circuit 2122 is connected across both ends of the current limiting element 2121 to detect the current flowing through the current limiting element 2121. The overcurrent determination circuit 2123 is coupled to the current detecting circuit 2122 to generate an overcurrent detecting signal Sd indicating whether the output current Io exceeds the threshold current based on the detection result of the current detecting circuit 2122. The protection trigger circuit 2124 is coupled to the output end of the overcurrent determination circuit 2123 to receive the overcurrent detection signal Sd, wherein the protection trigger circuit 2124 controls the conduction state of the current limiting element 2121 based on the overcurrent detection signal Sd, thereby determining whether to trigger the overcurrent protection function.

Specifically, the current limiting element 2121 is normally turned-on, so that the output current Io can be provided to the LED module Lm. Under the condition that the protection trigger circuit 2124 is configured not to trigger the overcurrent protection function based on the overcurrent detection signal Sd, the protection trigger circuit 2124 controls the current limiting element 2121 to remain in on-state, so that the output voltage Vo and the output current Io can be normally provided to the LED module Lm.

On the other hand, when the protection trigger circuit 2124 decides to trigger the overcurrent protection function based on the overcurrent detection signal Sd, the protection trigger circuit 2124 controls the current limiting element 2121 to turn off, thereby disconnecting the power supply circuit. At this moment, the output current Io is stopped from being supplied to the LED module Lm, so that the LED module Lm is not turned on/off.

In the switch module 220, the first switch module 221, the second switch module 222 and the third switch module 223 are respectively connected in series with the red light unit Lu1, the green light unit Lu2 and the blue light unit Lu3, and are respectively switched on in response to the control signals Sc_R, Sc_G and Sc_B received from the control module 230.

In the control module 230, the control signal generating circuit 231 is coupled to the overcurrent determination circuit 2123 of the power supply module 210 to receive the overcurrent detection signal Sd. The control signal generating circuit 231 is used to output the first control signal/current limiting signal Slc when the overcurrent detection signal Sd indicates that the output current Io exceeds the threshold current. The microcontroller 232 is used to output the second control signal/normal operation signal Sn, in which the first control signal Slc and the second control signal Sn have different signal formats/characteristics as described in the previous embodiment. The output control circuit 233 is coupled to the control signal generation circuit 231, the microcontroller 232 and the first to third switch components 221-223 of the switch module 220. The output control circuit 233 is used to selectively output the first control signal Slc or the second control signal Sn to control the switching of the switch module 220.

Specifically, when the output control circuit 233 receives the first control signal Slc, it means that the overcurrent detection signal Sd indicates the occurrence of overcurrent, so the output control circuit 233 outputs the first control signal Slc as the control signals Sc_R, Sc_G and Sc_B provided to the first to third switching components 221-223. At this moment, the second control signal Sn output by the microcontroller 232 is shielded or bypass by the output control circuit 233. Meanwhile, the conduction time of the red light unit Lu1, the green light unit Lu2 and the blue light unit Lu3 are respectively reduced in response to the control signals Sc_R, Sc_G and Sc_B, so that the output current Io can be reduced to below the threshold current, thus protecting the trigger circuit 2124 from turning off the current limiting element 2121 due to triggering the overcurrent protection function.

On the other hand, when the output control circuit 233 does not receive the first control signal Slc, it means that no overcurrent has occurred at this moment, and thus the output control circuit 233 takes the second control signal Sn preset by the microcontroller 232 as the control signals Sc_R, Sc_G and Sc_B provided to the first to third switching components 221-223.

In the control module 230 of this embodiment, because the microcontroller 232 mainly outputs the second control signal Sn routinely, there is no need for additional adjustment on the output, so that the microcontroller 232 of this embodiment can be implemented with a conventional microcontroller architecture without additional circuit design changes. In other words, the control signal generating circuit 231 and the output control circuit 233 in the control module 230 can be peripheral circuits configured outside the microcontroller 232.

Referring to FIG. 3B, the LED module Lm of this embodiment also includes a red light unit Lu1, a green light unit Lu2 and a blue light unit Lu3, but the present disclosure is not limited thereto. In this embodiment, the LED driving device 300 includes a power supply module 310, a switch module 320 and a control module 330. The power supply module 310 includes a conversion circuit 311 and an overcurrent protection circuit 312. The switch module 320 includes a first switch module 321, a second switch module 322 and a third switch module 323. The control module 330 includes a microcontroller 331.

The configuration of the power supply module 310 and the switch module 320 in this embodiment is similar to that illustrated in in the previous embodiment of FIG. 3A, and hence the configuration and operation of related components (e.g., the current limiting element 3121, the current detecting circuit 3122, the overcurrent determination circuit 3123 and the protection trigger circuit 3124) can be referred to the above embodiment. The detailed descriptions thereof are omitted here for brevity.

Compared with FIG. 3A, the main difference of this embodiment is that the function of the control module 330 is integrated in the microcontroller 331, that is, the microcontroller 331 can determine whether the signal format/characteristics of the output control signals Sc_R, Sc_G and Sc_B are the first control signal or the second control signal based on the overcurrent detection signal Sd alone.

Specifically, the microcontroller 331 of this embodiment is coupled to the power supply module 310 and the switch module 320. The microcontroller 331 is used to receive the overcurrent detection signal Sd from the overcurrent determination circuit 3123 of the power supply module 310, and decide to generate the first control signal or the second control signal different from the first control signal as the control signals Sc_R, Sc_G and Sc_B to be output to the switch module 320 based on the overcurrent detection signal Sd. The microcontroller 331 includes an overcurrent control unit 3311 and a control signal generation unit 3312. The overcurrent control unit 3311 is used to receive the overcurrent detection signal Sd, and generate the current limit indication signal Sind based on the overcurrent detection signal Sd. The control signal generation unit 3312 is coupled to the current control unit 3311. The control signal generating unit 3312 is used to generate the first control signal or the second control signal based on the overcurrent indication signal as the control signals Sc_R, Sc_G and Sc_B for controlling the on-state of each switch component 321-323 of the LED module Lm.

More specifically, when the overcurrent control unit 3311 receives the overcurrent detection signal Sd with a first signal characteristic (e.g., a signal with high level), the overcurrent control unit 3311 outputs the enabled current limit indication signal Sind, so that the control signal generation unit 3312 outputs the first control signal (e.g., Slc) as the control signals Sc_R, Sc_G and Sc_B in response to the enabled current limit indication signal Sind.

On the other hand, when the overcurrent control unit 3311 receives the overcurrent detection signal Sd with a second signal characteristic (e.g., a signal with low level), the overcurrent control unit 3311 outputs the disabled current limit indication signal Sind, so that the control signal generation unit 3312 outputs the second control signal (e.g., Sn) as the control signals Sc_R, Sc_G and Sc_B in response to the disabled current limit indication signal Sind.

Similar to the previous embodiment, when the control signal generating unit 3312 generates the first control signal to control the switching module 320, the current generated by the LED module Lm in response to the first control signal is smaller than the current generated by the LED module Lm in response to the second control signal, so that the output current Io can be limited to a current value lower than the threshold current when the specifications are not matched, so as to prevent the overcurrent protection function of the power supply module 310 from being triggered.

In some embodiments, the control module 230/330 can unitize the control signals Sc_R, Sc_G and Sc_B in a specific format to emit an overcurrent prompt when overcurrent occurs in the red light unit Lu1, the green light unit Lu2 or the blue light unit Lu3 of the LED module Lm.

The overcurrent prompt may include: lowering the luminous brightness of at least one of the red light unit Lu1, the green light unit Lu2 and the blue light unit Lu3 to prompt the user by lowering the brightness of the red/green/blue light; separately enabling at least one of the red light unit Lu1, the green light unit Lu2 and the blue light unit Lu3 in a preset order or in a random order to prompt the user with blinking of the LED module Lm; and disabling at least one of the red light unit Lu1, the green light unit Lu2 and the blue light unit Lu3 to prompt the user with different colored emitting light.

Figure 4:
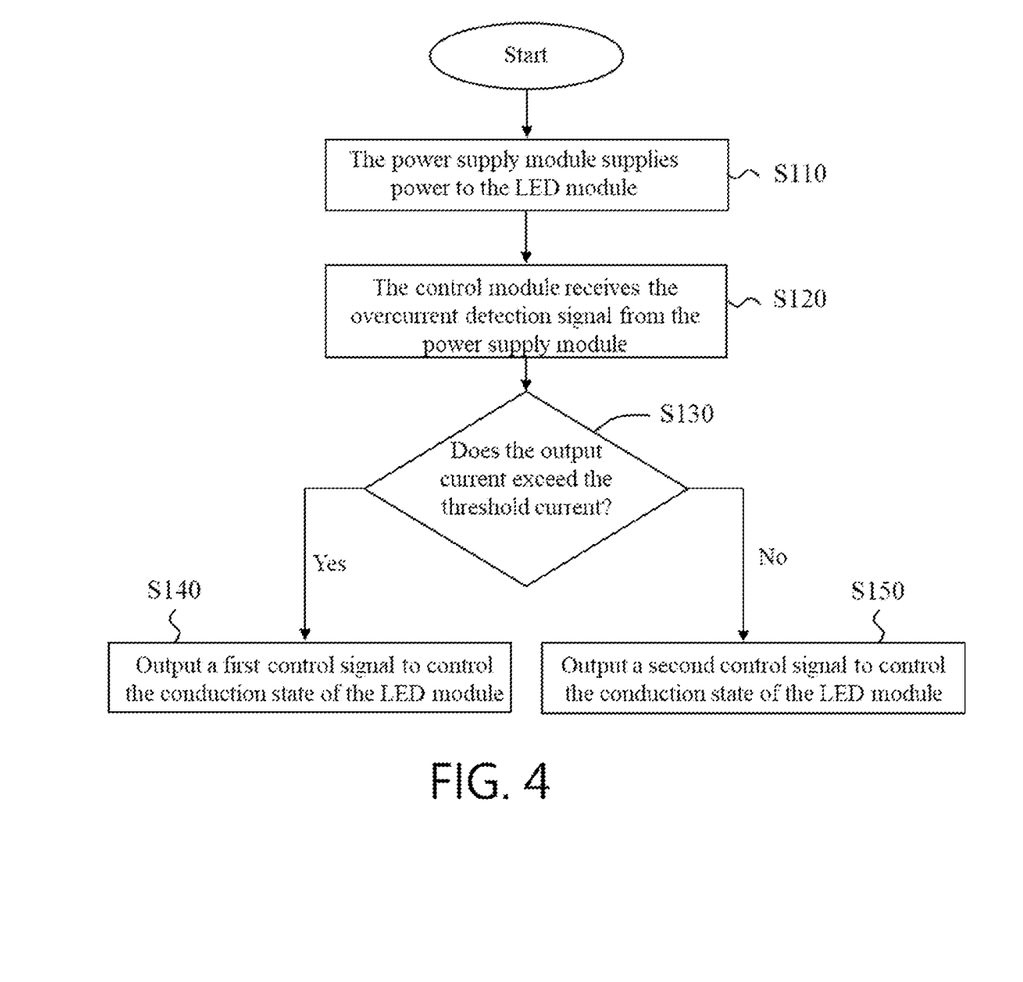
FIG. 4 is a flowchart illustrating the steps of a method for controlling an LED module based on an embodiment of the present disclosure.

FIG. 4 is a flowchart illustrating the steps of a method for controlling an LED module based on an embodiment of the present disclosure. Referring to FIG. 4, the control method of this embodiment can be applied to the LED driving devices 100, 200 and 300 described in FIG. 1 to FIG. 3B, but the present disclosure is not limited thereto.

The control method of this embodiment may include steps as follows. The power supply module (e.g., 110, 210 and 310) supplies power to the LED module (e.g., Lm) (Step S110). The control module (e.g. 130, 230, 330) receives the overcurrent detection signal (e.g. Sd) of the power supply module, wherein the overcurrent detection signal is used to indicate whether the output current (e.g. Io) provided to the LED module exceeds the threshold current (e.g. Ith), so that the power supply module can decide whether to trigger the overcurrent protection function (Step S120). The control module determines whether the output current exceeds the threshold current based on the overcurrent detection signal (Step S130). When the overcurrent detection signal indicates that the output current exceeds the threshold current (which means the determination result is "Yes"), the control module outputs the first control signal (e.g., Slc) to control the on-state of the LED module, so that the power supply module does not trigger the overcurrent protection function (Step S140). When the overcurrent detection signal indicates that the output current does not exceed the threshold current (no), the control module outputs a second control signal (e.g., Sn) different from the first control signal to control the conduction state of the LED module (Step S150). The current generated by the LED module in response to the first control signal is smaller than the current generated by the LED module in response to the second control signal.

To sum up, the LED driving device, the microcontroller and the control method of the LED module in the disclosed embodiment can be aware of the operational state of the power supply module by capturing the overcurrent detection signal, and further reduce the output current of the power supply module by reducing the on-time and/or frequency of the LED module when there could be overcurrent risk, so that the LED module and the LED driving device does not trigger the overcurrent protection function when the specifications are not matched, making the LED module unable to be lit. In addition, the LED driving device of this embodiment can further make the LED module send a prompt to remind the user that there may be a specification mismatch between the current LED module and the LED driving device when it is determined that the power supply module has an overcurrent condition.

What is claimed is:

1. An LED driving device for driving an LED module, comprising:
    a power supply module, configured to supply power to the LED module and having an overcurrent protection function, detect an output current provided to the LED module, wherein the power supply module determines whether to trigger the overcurrent protection function based on whether the output current exceeds a threshold current;
    a switch module, connected in series with the LED module; and
    a control module, coupled to the power supply module and the switch module, configured to receive an overcurrent detection signal indicating whether the output current exceeds the threshold current, and control a conduction state of the switch module based on the overcurrent detection signal to adjust a current passing through the LED module;
    wherein when the overcurrent detection signal indicates that the output current exceeds the threshold current, the control module outputs a first control signal based on the overcurrent detection signal to control the switch module to prevent the overcurrent protection function from being triggered.

2. The LED driving device according to claim 1, wherein: when the overcurrent detection signal indicates that the output current does not exceed the threshold current, the control module outputs a second control signal different from the first control signal based on the overcurrent detection signal to control the switch module.

3. The LED driving device according to claim 2, wherein at least one of a duty ratio and a frequency of the first control signal is different from that of the second control signal.

4. The LED driving device according to claim 1, wherein the switch module is switched in response to the first control signal, so that the LED module generates an overcurrent prompt.

5. The LED driving device according to claim 4, wherein the LED module comprises a first wavelength light emitting unit, a second wavelength light emitting unit and a third wavelength light emitting unit, and the overcurrent prompt comprises reducing luminous brightness of at least one of the first wavelength luminous unit, the second wavelength luminous unit and the third wavelength luminous unit.

6. The LED driving device according to claim 4, wherein the LED module comprises a first wavelength light emitting unit, a second wavelength light emitting unit and a third wavelength light emitting unit; and the overcurrent prompt comprises separately enabling at least one of the first wavelength light emitting unit, the second wavelength light emitting unit and the third wavelength light emitting unit.

7. The LED driving device according to claim 4, wherein the LED module comprises a first wavelength light emitting unit, a second wavelength light emitting unit and a third wavelength light emitting unit, and the overcurrent prompt comprises disabling at least one of that first wavelength light emit unit, the second wavelength light emitting unit and the third wavelength light emitting unit.

8. The LED driving device according to claim 1, wherein the control module comprises:
    a microcontroller, coupled to the power supply module and the switch module, and configured to receive the overcurrent detection signal from the power supply module and determine, based on the overcurrent detection signal, whether to generate and output the first control signal or a second control signal different from the first control signal to the switch module;
    an overcurrent control unit, configured to receive the overcurrent detection signal from the power supply module and generate a current limiting indication signal based on the overcurrent detection signal; and
    a control signal generation unit, coupled to the overcurrent control unit, and configured to generate and provide the first control signal or the second control signal based on the current limiting indication signal to the switch module;
    wherein when the overcurrent control unit receives the overcurrent detection signal indicating that the output current exceeds the threshold current, the overcurrent control unit outputs the enabled current limit indication signal, so that the control signal generation unit outputs the first control signal in response to the enabled current limit indication signal, and
    when the overcurrent control unit receives the overcurrent detection signal indicating that the output current does not exceed the threshold current, the overcurrent control unit outputs the disabled current limit indication signal, so that the control signal generation unit outputs the second control signal in response to the disabled current limit indication signal.

9. A microcontroller for controlling an LED module, comprising:
    an overcurrent control unit, configured to receive an overcurrent detection signal and generate a current limit indication signal based on the overcurrent detection signal; and
    a control signal generation unit, coupled to the overcurrent control unit, and configured to generate a first control signal or a second control signal based on the current limiting indication signal to control a conduction state of the LED module, wherein
    when the overcurrent control unit receives the overcurrent detection signal with a first signal characteristic, the overcurrent control unit outputs the enabled current limit indication signal, so that the control signal generation unit outputs the first control signal in response to the enabled current limit indication signal, and when the overcurrent control unit receives the overcurrent detection signal with a second signal characteristic, the overcurrent control unit outputs the disabled current limit indication signal, so that the control signal generation unit outputs the second control signal in response to the disabled current limit indication signal, and a current generated by the LED module in response to the first control signal is smaller than a current generated by the LED module in response to the second control signal.

10. A method for controlling an LED module, comprising:

supplying, by a power supply module, power to the LED module;

receiving, by a control module, an overcurrent detection signal of the power supply module, wherein the overcurrent detection signal indicates whether an output current provided to the LED module exceeds a threshold current, to make the power supply module decide whether to trigger an overcurrent protection function;

outputting, by the control module, a first control signal to control a conduction state of the LED module to prevent the power supply module from triggering the overcurrent protection function when the overcurrent detection signal indicates that the output current exceeds the threshold current; and outputting, by the control module, a second control signal different from the first control signal to control the conduction state of the LED module when the overcurrent detection signal indicates that the output current does not exceed the threshold current;

wherein a current generated by the LED module in response to the first control signal is smaller than a current generated by the LED module in response to the second control signal.

* * * * *